(12) United States Patent
Gibson (10) Patent No.: US 7,447,662 B2
(45) Date of Patent: Nov. 4, 2008

(54) TRANSACTION PROCESSING SYSTEM

(75) Inventor: Garry H. Gibson, Nottingham (GB)

(73) Assignee: Vett (UK) Limited, Balderton (GB)

( * ) Notice: Subject to any disclaimer, the term of this patent is extended or adjusted under 35 U.S.C. 154(b) by 726 days.

(21) Appl. No.: 10/332,468

(22) PCT Filed: Jul. 10, 2001

(86) PCT No.: PCT/GB01/03088

§ 371 (c)(1),
(2), (4) Date: Jun. 30, 2003

(87) PCT Pub. No.: WO02/05230

PCT Pub. Date: Jan. 17, 2002

(65) Prior Publication Data

US 2004/0030607 A1    Feb. 12, 2004

(30) Foreign Application Priority Data

Jul. 10, 2000    (GB)    .................................. 0016905.2

(51) Int. Cl.
*G06Q 30/00*    (2006.01)
*H04K 1/00*    (2006.01)
*H04L 9/00*    (2006.01)

(52) U.S. Cl. .............................. 705/75; 705/64; 705/77; 705/78

(58) Field of Classification Search ................... 705/64, 705/75, 77, 78
See application file for complete search history.

(56) References Cited

U.S. PATENT DOCUMENTS

| | | | |
|---|---|---|---|
| 5,684,951 A | 11/1997 | Goldman et al. | |
| 5,727,163 A | 3/1998 | Bezos | |
| 5,748,908 A * | 5/1998 | Yu | 705/44 |
| 5,757,917 A * | 5/1998 | Rose et al. | 705/79 |
| 5,903,721 A * | 5/1999 | Sixtus | 726/2 |
| 5,903,878 A * | 5/1999 | Talati et al. | 705/26 |
| 6,012,144 A | 1/2000 | Pickett | |
| 6,014,650 A * | 1/2000 | Zampese | 705/44 |
| 6,016,479 A * | 1/2000 | Taricani, Jr. | 705/19 |
| 6,023,682 A * | 2/2000 | Checchio | 705/18 |
| 6,058,250 A * | 5/2000 | Harwood et al. | 709/227 |

(Continued)

FOREIGN PATENT DOCUMENTS

EP    0 814 589    12/1997

(Continued)

OTHER PUBLICATIONS

Borenstein, N.S., "Perils and Pitfalls of Practical Cybercommerce," Communications of the ACM, vol. 39, No. 6, pp. 36-44, Jun. 1996.*

(Continued)

*Primary Examiner*—Nicholas D Rosen
(74) *Attorney, Agent, or Firm*—Nixon & Vanderhye PC (57) ABSTRACT

A method of operating a transaction processing system (19) for confirming orders placed over a public data network (1), comprising: receiving first order references from a number of different merchant sites (7) via first data communication paths; receiving payment data and second order references from a number of customers via second communication paths different from said first communication path; and matching said first and second order references and settling payments.

18 Claims, 6 Drawing Sheets

U.S. PATENT DOCUMENTS

| | | | |
|---|---|---|---|
| 6,088,683 A * | 7/2000 | Jalili | 705/26 |
| 6,246,996 B1 * | 6/2001 | Stein et al. | 705/26 |
| 6,298,335 B1 * | 10/2001 | Bernstein | 705/40 |
| 6,341,353 B1 * | 1/2002 | Herman et al. | 726/5 |
| 6,356,752 B1 * | 3/2002 | Griffith | 455/406 |
| 6,477,578 B1 * | 11/2002 | Mhoon | 709/229 |
| 6,574,730 B1 * | 6/2003 | Bissell et al. | 713/168 |
| 6,609,113 B1 * | 8/2003 | O'Leary et al. | 705/39 |
| 6,711,551 B1 * | 3/2004 | Itakura et al. | 705/26 |
| 6,745,936 B1 * | 6/2004 | Movalli et al. | 235/379 |
| 6,823,318 B1 * | 11/2004 | Creswell et al. | 705/26 |
| 7,379,919 B2 * | 5/2008 | Hogan et al. | 705/64 |
| 2002/0013765 A1 * | 1/2002 | Shwartz | 705/39 |
| 2003/0097331 A1 * | 5/2003 | Cohen | 705/39 |
| 2005/0154649 A1 * | 7/2005 | Jalili | 705/26 |
| 2006/0168663 A1 * | 7/2006 | Viljoen et al. | 726/27 |
| 2006/0259441 A1 * | 11/2006 | Tresser | 705/78 |
| 2007/0027803 A1 * | 2/2007 | Brandes et al. | 705/39 |

FOREIGN PATENT DOCUMENTS

| | | |
|---|---|---|
| EP | 0 926 611 | 6/1999 |
| JP | 10-326310 A * | 12/1998 |
| WO | 99/07121 | 2/1999 |
| WO | 99/57663 | 11/1999 |
| WO | WO 00/02168 | 1/2000 |
| WO | 01/01361 | 1/2001 |
| WO | 01/43092 | 6/2001 |
| WO | 01/65432 | 9/2001 |

OTHER PUBLICATIONS

Buss, D.D., "Dealing with Digital Dollars," Home Office Computing, vol. 15, No. 6, p. 110, Jun. 1997.*

Anon., "National Data Corporation Subsidiary, Global Payment Systems, Announces at BAI Show in New Orleans—New 'All-in-One' Internet Store Service for Merchants," PR Newswire, Dec. 3, 1997.*

Microsoft Press Computer Dictionary, Third Edition, Microsoft Press, Redmond, Washington, 1997, p. 348.*

Anon., "The Porter Option," Rocky Mountain News, final edition, editorial section, p. 96, May 11, 1990.*

Anon., "Landover Man Sentenced to 25 Years in Annapolis Carjacking," Baltimore Sun, Howard County edition, News section, p. 6B, Apr. 1, 1998.*

Locher, G., "Keep Your L/Cs in Line with State-of-the-Art Bank Processing," Corporate Cashflow Magazine, vol. 11, No. 8, p. 37, Jul. 1990.*

Anon., "GTOS: GTOS Scanning Bureau Is Numero Uno," M2 Presswire, Dec. 13, 1999.*

Bohm, "Who Carries the Risk of E-Fraud", e.businessreview, Strategy E-Fraud, Sep. 7, 2000, pp. 28-29.

* cited by examiner

TRANSACTION PROCESSING SYSTEM

BACKGROUND

1. Technical Field

The invention relates to a transaction processing system and methods and, apparatus relating thereto. More specifically, but not exclusively, the invention relates to authorizations for purchases of goods, both electronic and physical, or services initially ordered over an ordering channel such as a packet-switched public data network.

2. Description of Related Art

The most common payment method for purchases of services over the Internet's world Wide Web ("Web") is by credit card. To make a payment on the Internet customers input their credit card number and other required details into a form, which is usually transmitted via a secure connection. Upon submission the credit card data are encrypted and sent to the credit card institute for processing. Once the credit card data have been verified the merchant receives notification of payment along with the order details.

Many Internet users perceive the Internet to be insecure and are thus cautious and reluctant to transmit sensitive payment data to purchase goods or services over the Internet.

WO 99/07121 describes a method for conducting electronic commerce transactions via the Internet or any electronic communication system. A merchant opens an account on a commerce server and supplies information about items sold by the merchant. The commerce server stores this information in a database entry and provides the merchant with a universal resource locator (URL) containing the key to the merchant's entry in the commerce server's database. The merchant supplies this URL to customers wishing to purchase an item, causing customers to be connected to the commerce server. The commerce server collects payment information from the customer, (for example credit card or electronic fund transfer data), conducts the electronic commerce transaction with a remote payment system and notifies the customer and merchant of the result.

U.S. Pat. No. 5,727,163 describes a method allowing a customer to securely transmit credit card information when an order is placed over an insecure network such as the Internet. This system is only for use by a single merchant Website. The customer completes an order form received from the merchant Website, including a subset of the credit card number. This order is transmitted over the Internet to the merchant's location and is subsequently stored in a database connected to a computer at the merchants location. The customer then calls the merchant's system via the public telephone system to complete the information of the credit card number. A touch-tone phone is used for this call and an automated attendant system responds to the telephone call in the remote location. The subset of the credit card information transmitted over the unsecured network is used as a key to match the complete credit card number information received via the telephone line with the order information in the remote merchant's database in order to finalize the order. The completed order is then stored in the remote database. The method may further comprise transmitting a message confirming the order data to the customer. This message may be sent for example by e-mail.

U.S. Pat. No. 6,012,144 describes a method for securely transmitting sensitive data to a remote data store. A first subset of the data is sent via a first communication path using a first protocol and a second subset of the data is sent via a second communication path using a second different protocol. The Internet and the public telephone system via an Interactive Voice Response (IVR) system are used for the data transfer via the first and second communication path, respectively. The two subsets of confidential data are subsequently stored in two different parts of a remote data store. The system can for example be used for preregistration of credit card data for future purchases on the Internet. When the user wishes to make a purchase on the Internet, he or she accesses a Web page to order products. An Internet connection is established to the first part of the remote database via a connected computer and a preregistered credit card is selected. A computer connected to the second part of the remote data bane calls the user and asks for verification of the purchase to take place. After confirmation the second part of the remote computer database co-operates with the first part to complete the credit card information. A key record is used to match the two subsets of data. The final message is then transmitted over a secure network to the credit card company.

A bill payment system known as Bpay™ is known. In this system, a company having an established relationship with a customer provides the customer with the facility to pay a bill via a phone or Internet banking service. The company prints the bill with a customer reference as well as the company reference within the Bpay system, and the customer enters these details along with an amount to be paid when calling the bank or logging on to the system. However, this system is only arranged for transactions which have already been completed, such as the provision of utility company services, and provide only a method for paying a bill.

BRIEF SUMMARY OF EXEMPLARY EMBODIMENTS

The present invention seeks to provide alternative and improved transaction systems such an payment systems for purchasing goods or services over a public data network such as the Internet.

In accordance with one aspect of the invention, there is provided method of operating a transaction processing system enabling users to authorize transactions said system comprising at least a first data communications interface and a second data communications interface, comprising: receiving transaction data, relating to a specific transaction to be authorized by a user, via a first data communication path, at said first data communications interface: conducting communications over a second data communication patio, different to said first data communication path, with said user over said second data communications interface; using said second path, conducting a secure access procedure in which authentication data is received and said authentication data is verified; using said second path, receiving a transaction reference relating to said specific transaction from said user, said transaction reference not being previously transmitted to said user in said second communication path; using said second path, receiving confirmation from said user; and in response to said confirmation, transmitting an authorization signal to authorize said transaction.

This aspect of the invention allows a transaction to be authorized in a verifiable and non-repudiable manner without the transacting parties having to pet up complex systems for conducting and verifying such authorizations. An offering party may transmit an offer, and subsequently have it accepted in a secure and verifiable manner, without having an established relationship with the other party. The offer may for example be in the form of a quote which may, or may not, be accepted by the other party. The other party uses the transaction system to authorize payment and accept the offer.

If the offer is not to be accepted, the system can subsequently disable the offer data after a selected period of time.

According to another aspect of the present invention, is there is provided a method of operating a transaction system in communication with a transaction processing system serving a plurality of different similar transaction systems, said method comprising, receiving transaction data from a number of customers; storing said transaction data in a record holding said transaction data as a pending transaction; generating transaction references for referencing said transaction data; notifying transaction references to a transaction processing system; transmitting the same transaction references to said customers; and authorizing a transaction corresponding to a particular set of said transaction data in response to said transaction processing system confirming the customer having authorized the transaction, wherein said transaction references are constructed so as to be unique both within said transaction processing system and said transaction systems.

According to this aspect the transaction need not have previously received and stored customer account data, nor other sensitive customer data, in order for a transaction to be authorized in a verifiable manner in the TPS. The order reference is unique in both the payment processing system and in the ordering system. Therefore it can be used in both systems to match information received in different communication messages or via different communication paths.

Preferably, offer messages are transmitted from the ordering system to the customers including the order data. Such messages may include comprehensive information relating to the order.

According to yet another aspect of the present invention, there is provided a method of managing orders in a transaction processing system comprising: receiving order data from a number of merchants; monitoring said order data and order confirmations; transmitting messages to the merchants and/or customers in response to said monitoring; settling payments in response to receiving said order confirmation and payment data from customers.

This aspect of the present invention allows the customer to initiate the confirmation of the order and thus the completion of the transaction. It is advantageous for the customers that the system provides a possibility of waiting a period of time, dependent upon the customer, before the order is confirmed to reflect on the purchase or to check offers from other ordering systems.

Preferably, unconfirmed order data are disabled after a predetermined time period, corresponding for example to an offer period.

This aspect of the invention again allows the customer to initiate the completion of the transaction and to control the ordering process. At the same time this aspect provides the ordering system with the ability to handle offers sent out as pending orders.

According to another aspect of the present invention, there is provided a method of settling taxes from sales performed over a public data network in a transaction processing system, comprising: receiving order details from a number of merchants: receiving confirmation of said orders from a number of customers; settling payment of said orders, storing tax-relevant data in a database; and settling taxes relating to said orders on behalf of said merchants.

This aspect of the invention provides a method of controlling the settlement of taxes from purchases over a public data network. Preferably the transaction processing system operates with customers throughout an area with a common sales tax system. The method described in this aspect of the invention provides more transparency for the processing of sales taxes, because the payment may be performed in the same area as that in which the sales taxes are settled.

According to yet another aspect of the present invention, there is provided a method of performing a purchase from an transaction system over a public data network, comprising: placing an order over a first communication path; receiving an offer in the form of offer data comprising an order reference from said ordering system; transmitting confirmation data including said order reference to a transaction processing system via a second communication path different from said first communication path.

This aspect provides the customer with control of the complete purchase process, including the settlement of the payment, while sensitive payment data may be transmitted in a secure way over a second communication path. This aspect further provides a convenient way for the customer to transmit payment data to the transaction processing system, because the order reference is passed to the transaction processing system and can be used to match the payment data to the order data at the transaction processing system. Preferably, other details of the transaction, like for example a list or description of the ordered products and the total value of the order, along with the terms and conditions of the sale, are transmitted from the merchant to the customer. This provides the customer with a persistent record of the transaction.

According to yet another aspect of the present invention, there is provided a method of conducting instructions on behalf of users of a public data network, comprising: receiving first nets of data and/or instructions and, first references from a number of users via first communication paths; receiving confirmation of said first sets and/or second nets of data and/or instructions from a number of users via second communications paths different from said first communications paths, matching said first sets to said second sets using said first and second references; and carrying out said instructions This aspect provides a convenient method of conducting instructions via a public data network. Again only a minimum of data and/or instructions have to be transmitted between the data network users, because the data and/or instructions received in different communication messages or via different communication paths can be matched by the order references.

In accordance with a further aspect of the present invention there is provided method of operating a transaction processing system for placing orders over a public data network, comprising; receiving notification of first order references from a number of different public data network merchants via first data communication paths; receiving transaction data and second order references from a number of customers via second communication paths different from said first communication paths; and matching said first and second order references and settling payments.

This aspect provides an efficient and convenient payment method where only a minimum of data hat to be transmitted between customers and the transaction processing system and the merchants and the transaction processing system. Instead of transmitting all the information from one location to another, the order references can be used to match information received in different communication messages or via different communication paths. Preferably, establishing the communication for transmitting the payment data is initiated by the customer. This allows the customer to reconsider before he or she decides to confirm the order and to settle the payment.

According to a yet further embodiment of the invention, there is provided a method of enabling users to authorize transactions in a banking transaction system, comprising: receiving transaction data, relating to a banking transaction to be conducted, via a packet switched data connection with said user; conducting a voice telephony connection with said user; using said voice telephony connection, conducting a secure access procedure in which said user inputs authentication data and said authentication data is verified; receiving confirmation of said banking transaction from said user via said voice telephony connection; and in response to said confirmation, transmitting an authorization signal to authorize said transaction.

This aspect provides a method in which banking transaction systems which are perceived to be insecure in some way, may enhance the perceived security of the transaction. Furthermore, since the initial transaction data is initially supply, for example by filling in a Web form on an internet connection over the packet data communications link, the process may be made more convenient to the user than requiring the user to specify the entire transaction over a telephone line. Banking transactions may be conducted in part in relatively insecure environments, such as public internet terminals, and confirmed via the facility of a telephone line connection.

According to one embodiment of the present invention, the system combines the advantages of the Internet, i.e. a convenient way of purchasing goods or services for the customer with a possibility to settle payment for these purchases using familiar and secure circuit-switched voice telephony connections. The system provides an interface between the Internet and widely accepted payment methods like credit card payment by telephone or direct tele-banking.

Only modifications to existing systems are necessary in order to implement the different embodiments of the present invention. Moreover, the system provides additional protection against fraud for merchants.

BRIEF DESCRIPTION OF THE DRAWINGS

Further aspects and advantages of the invention will be apparent from the following, in which different embodiments of the invention will now be described by way of example only, with reference to the accompanying drawings in which.

DETAILED DESCRIPTION OF EXEMPLARY EMBODIMENTS

Figure 1:
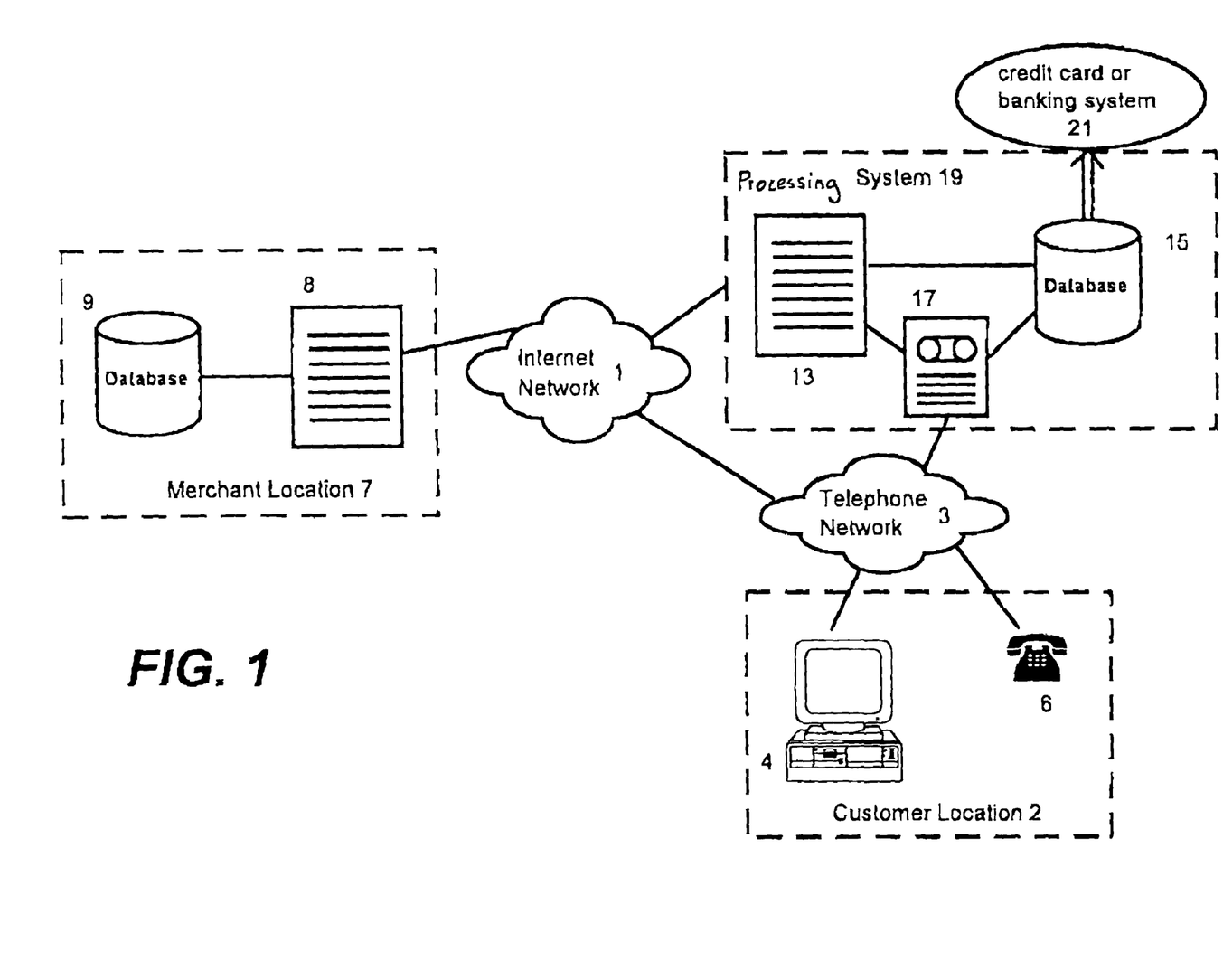
FIG. 1 schematically illustrates the principle components and communication links of a transaction processing system according to different embodiments of the present invention.

FIG. 1 illustrates the principal components and communication links used to implement the present invention in an embodiment of the system. In the customer's location 2, marked by a dashed line, there is provided a computer terminal 4 and a telephone 6. The computer 4 is connected via a modem (not shown) and the public telephone system 3 to the Internet 1. It is to be appreciated that a desk top personal computer, a portable computer, or even a cellular telephone with Internet connectivity can be used as the customer computer terminal. The telephone 6 in the customers location is connected to a public telephone system 3, which may be a fixed line system and/or a cellular system. In the case of an Internet-enabled telephone or suchlike being used, this may be used in place of both the computer terminal and the telephone.

At the merchant's location 7, there in provided a Web server 5 including a connection to the Internet 1, either via a modem or ISDN. The server 8 has access to a product and ordering service database 9. At the location of a central transaction processing system 19, there is provided a server 13 with a database 15 and a connection to the Internet 1 and an Interactive voice response unit 17 including a text-to-speech engine connected to the public telephone system 3. Alternatively, a dedicated link, such as a leased line, may be used between the transaction processing system 19 and each merchant location 7.

The computer with the connection to the Internet 1 at the customers and the merchant's location serve an a convenient interface for accessing and providing information about goods/services to be purchased, respectively. In this way an order for goods and services can be placed over the to Internet.

The voice response unit 17 in the transaction processing system 19 serves an a data communications interface to the customer over a circuit-switched telephone line connection. Telephone 6 is preferably a touch-tone phone. The public telephone line 3 is a relatively secure connection. The embodiments of the present invention described in the following therefore provide a convenient way to order and purchase products or services over the Internet 1 while the payment data are transmitted in a secure way using the telephone system 3. The payment is subsequently settled via credit card transaction processing or via an account facility provided by banking system 21.

Figure 2:
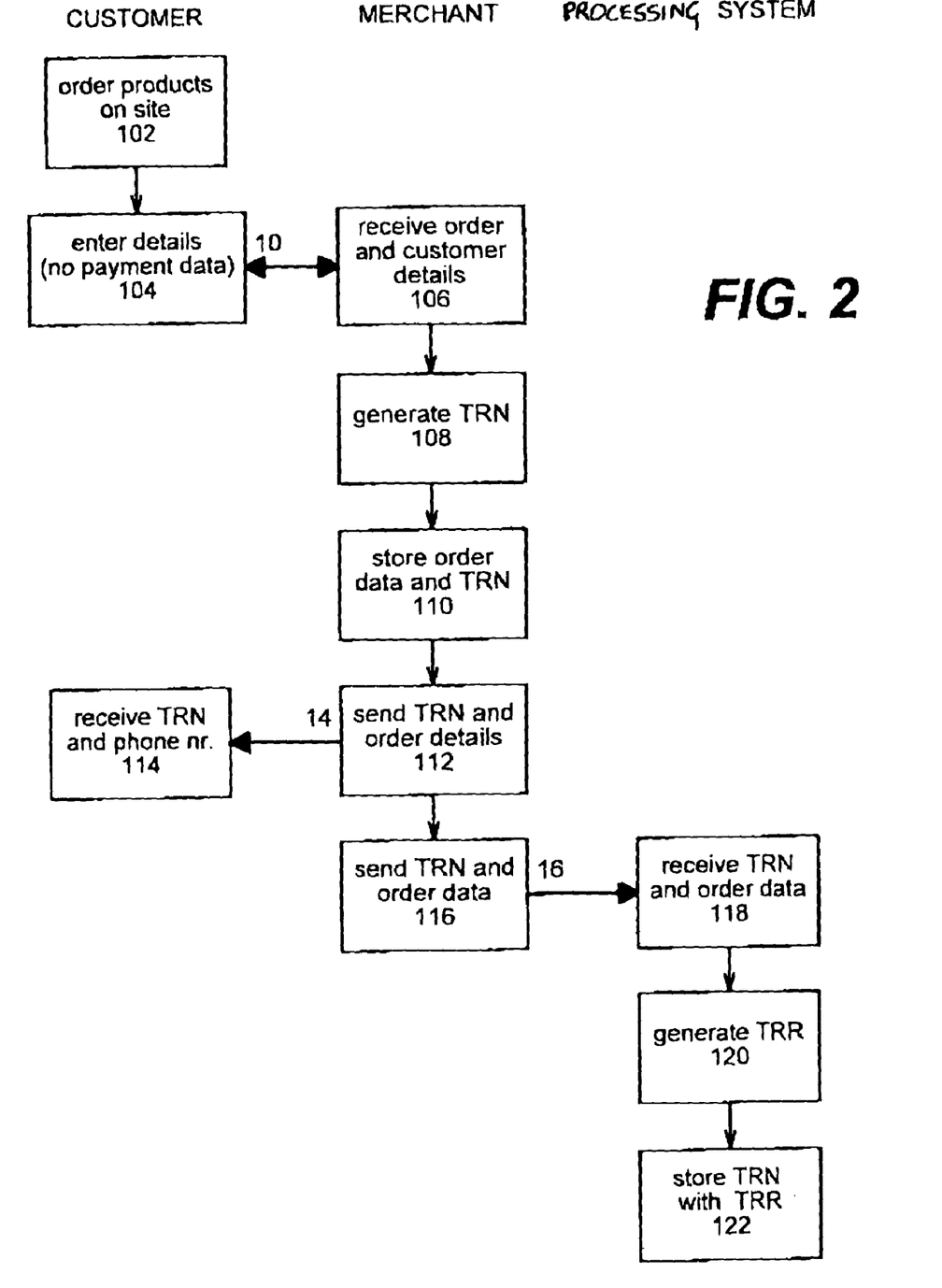
FIG. 2 is a flowchart diagram showing the steps for placing an order and transmitting order data to a transaction processing system according to one embodiment of the invention.

FIG. 2 illustrates steps carried out during the processing of an order transaction. The public data network ordering service of the merchant is in the form of Web pages stored on server 8 including images of products along with descriptions and prices enabling customers to view and select the products. Upon selection of an item, the data relevant for the purchase are automatically stored in a data record (known to Internet users as a shopping cart or basket) for processing. When the customer is ready to complete the transaction he or she selects a "checkout" option. Subsequently the content of the above described data record is displayed together with delivery charges and any tax that may apply. In this way the customer orders products on the merchant's Website (step 102). According to one embodiment of the present invention, the customer may complete the purchase by selecting a method of payment. The customer can choose between the following two options provided on a "checkout" Web page;

(i) Transaction confirmation and payment by credit card via the Internet according to current known procedures over a secure link such as a 'Secure Sockets Layer' (SSL) link or hypertext transfer protocol secure (https) link or (ii) Transaction confirmation and payment via the system 19 as will be described in the following.

In response to the customer selecting transaction confirmation and payment by the transaction processing system 19, the merchant server sends data to the customer computer terminal 4, in particular a Web browser therein, which presents a form page on the customer terminal's display, which requests the input of data including the customer's e-mail address and, in the case of a product to be shipped to the customer, a delivery address. The customer enters the required details (stop 104). However, a credit card number or any other sensitive customer payment data, are not requested.

Once a customer has entered required details he or she selects a 'submit transaction' symbol, causing the transmission of the information to the merchant's system via the Internet (communication link 10). After the merchant's system receives the order data and customer details in step 106, the merchant system generates a transaction reference number (TRN) in step 108. The TRN is chosen such that the order can be identified uniquely within the transaction processing system 19. The TRN number therefore contains preferably a first portion (the "merchant identification number") uniquely identifying the merchant's site in the transaction processing system 19 and a second portion which is, or is uniquely related to, a unique order number in the merchant's system (the merchant's order reference). The TRN together with confirmation of order value end instructions to call the transaction processing system 19 are subsequently transmitted to the customer in step 112 by e-mail (via communication link 14). The complete transaction details which are transmitted to the customer include a pro forma invoice, thus providing a record of the transaction which may be printed out by the customer. Terms and conditions of sale are included or attached to provide a persistent record thereof, thus providing the basis for a valid contract between the two parties. The customer is preferably independently aware of the telephone number to call the transaction processing system, it having previously been supplied for example by the customer's bank or financial institution.

When the customer is sent the offer data including the TRN, the merchant system stores the order data in an order pending file awaiting confirmation to be received from the transaction processing system 19 before the transaction is processed to completion. The TRN and order data are sent to the transaction processing system 19 in step 116. The data are transmitted to the transaction processing system by a secure link such as an SSL or https link (communication link 16) via the Internet. The transmitted information include preferably the Transaction Reference Number (TRN) the Website Uniform Resource Locator (URL), the value of order together with transaction details, the name of the customer and account address, the customers e-mail address. It may further include a merchant identification number (if not part of the TRN) and delivery address for the goods. All details are encrypted prior to transmission.

In response to receiving the TRN and order data from the merchants site the transaction processing system generates an internal transaction record reference (TRR), which is sequentially unrelated to the TRN and uniquely identifies the order within the transaction processing system, and returns it to the merchants site for storage in the order pending file for future reference against the order, step 120. The TRR is stored together with the TRN and order data of this transaction in Step 122.

Figure 3:
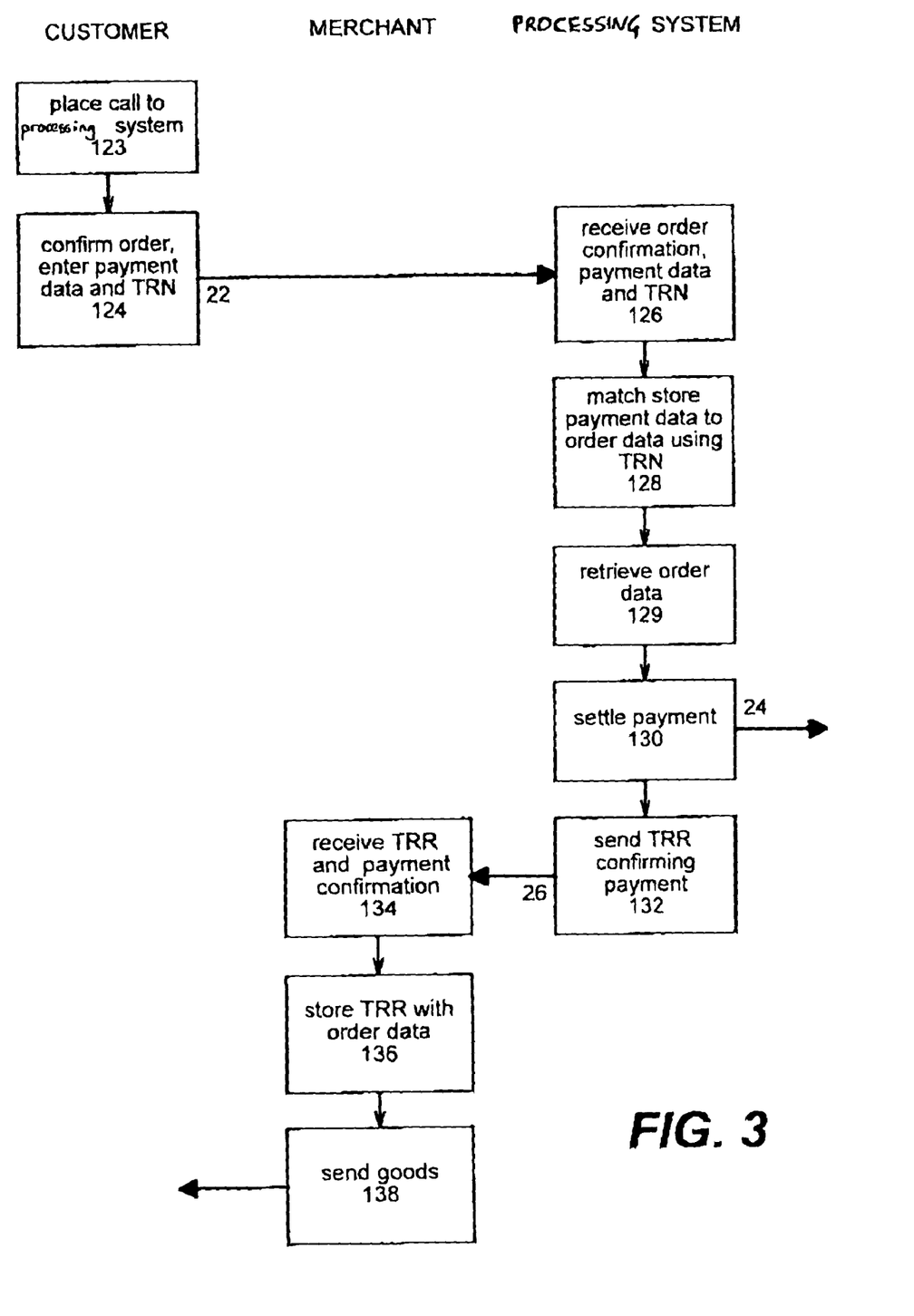
FIG. 3 is a flowchart diagram showing the steps of performing a secure transaction according to one embodiment of the present invention.

FIG. 3 illustrates stops carried out for confirming and settling the payment of an order transaction. The customer initiated a second communication link 22 by the merchant to confirm the order and complete the purchase. The call does not have to be placed immediately after the customer receives the TRN from the merchant. The customer may choose to initiate the call at any subsequent time within a certain time period, for example an offer period specified by the merchant in the original order transaction. The customer calls to establish a telephone circuit connection (22) to the transaction processing system 19 (step 123). The customer follows a menu of instructions to confirm the order and to transmit any sensitive payment data in step 124. For this purpose, the voice response unit 17 answers an inbound call with a welcome message and providing a menu of options. (For example select '1' for service 'A' and '2' for service 'B' with a selected numeral usually reserved for non-standard enquiries handled by an operator). Calling line identity can be employed as part of the customer identification procedure. The transaction processing system 19 will request entries for the transaction reference number TRN as a key to match the payment data to the order data and details already stored in the database 15 of transaction processing system 19. In addition the customer's bank account sort code and account number and/or credit card number, PIN and a request to verify order details are transmitted to the customer via automated speech signals. Transaction details identifying the products and/or services to be purchased may be communicated, at the customers request, to the customer by employing text-to-speech conversion. The customer enters the information via their telephone keypad and answers any additional requests for information to complete the purchase. The provision of authentication data, such as a PIN, by the customer provides a secure access procedure, whereby non-repudiation is provided in relation to the confirmation of the order which the user is conducting. In order to prevent a PIN replay security attack, the system may employ an authentication procedure whereby the customer is requested to input selected characters from a PIN or other security code, which selection is varied between access sessions.

Thus, the transaction processing system 19 receives information over a telephone line in step 126 and via Internet (either through a direct connection for example the World Wide Web or by E-mail) in step 118. The combination of the data received via the two different communication links allows the transaction processing system to finalize the order and settle the payment. The data received by the transaction processing system 19 from the merchant via Internet communication link (16) and the data received from the customer via telephone line (22) are matched using the TRN as a key (step 128). The transaction processing system 19 stores the payment data together with the order data and customers details in a local database. The transaction processing system 19 retrieves the order data stored in step 110 from the database, again using the TRN as a key, in order to settle the payment (Step 129). The central transaction processing system 19 settles the payment (step 130) with the credit card institutions in the usual way using a secure link (24) which is directly connected to the credit card companies. The payment data are encrypted and specific protocols are used as is required by the individual credit card institutions.

After the payment has been cleared, the transaction processing system 19 transmits a message confirming payment and including the TRR number to the merchant via the Internet communication link 26. The merchant scores the TRR in a local database 9 in step 136 and, in response to the order confirmation, passes the transaction data to an order management system to complete the order. Using the TRR to confirm authorization of the order is relatively secure since the TRR is known only to the merchant system and the transaction system, and not by the customer. However, in an alternative embodiment the TRN can be used to match the payment information of a particular transaction to the corresponding order already stored in the database in step 110. To complete the order the merchant sends out the goods or arranges for the services ordered in step 138.

The transaction processing system 19 may also offer payment via a debit account or other bank account facility. The procedure of completing the transaction is similar to the credit card payment as described before, except that the payment is cleared through the customers banking system. This allows customers payment of purchase directly from their bank accounts, without the need to use a credit card or debit card.

The transaction processing system 19 will process orders in a similar manner co chat described for payment by credit card. However, payment is transferred to a dedicated receiving account (DRA) bank account dedicated to receiving payments. In this situation the transaction processing system 19 is integrated in a telephone banking system. The transaction processing system 19 receives the transaction data in a similar way as was described in the first embodiment of the present invention.

The customer now calls a telephone number. This telephone number the customer received from the banking system is dedicated to telephone banking transactions in general and is preferably not specific to a particular transaction processing system transaction. The customer chooses the payment option from a menu presented by the bank system, which then asks for the customer's authentication/account code and PIN. The procedure of completing a transaction is similar to the credit card payment as described before and includes the confirmation of the order by the customer and the transmission of the TRN number as a key to match the order data to the payment data. In addition, the merchant's DRA bank account number has to be given to the transaction processing system 19. There is no reason to protect a DRA number from public knowledge as the account is designed to receive payments only, fund may only be transferred to the merchant's traditional trading account, which protects the account from fraudulent transactions. Therefore the DRA number can be transmitted from the merchant to the transaction processing system 19 by insecure communication link 16. Alternatively, the DRA number can be transmitted from the merchant to the customer by data link 10 or 14 and subsequently transmitted via the telephone network 3 to the transaction processing system 19.

Figure 4:
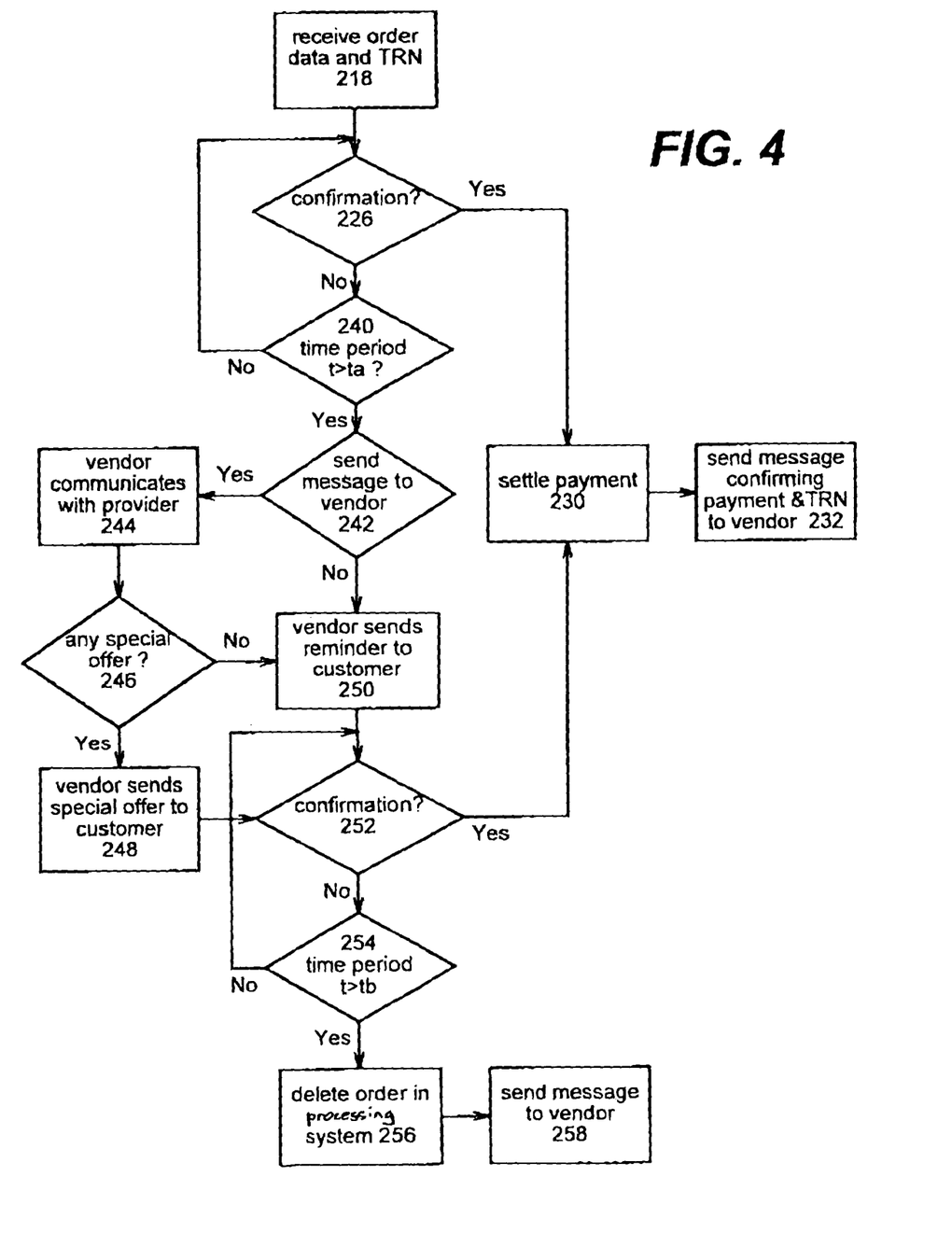
FIG. 4 shows a flowchart diagram with the individual steps of controlling and managing orders and settling payments for the orders according to one embodiment of the present invention.

The transaction processing system 19 also provides means for managing and controlling orders. FIG. 4 is a flowchart diagram showing the steps of managing and controlling orders. The transaction processing system 19 receives order data, customer details and a TRN from the merchant in step 218. In response to this message server 13, implementing an order management system, stores the information in a local database 15 and waits for order confirmation and payment instructions from the customer. The management system checks regularly in step 226 if a confirmation from the customer has been received. In case the system has received the order confirmation and payment instructions, the payment is settled and confirmed in steps 230 and 232, respectively, as described in the first embodiment of the present invention. If the time period t after receiving the order data from the merchant exceeds a predetermined time period ta, which may be preset in the system or may be specified by the merchant and transmitted in the transaction data pent by the merchant to the system on an order-by-order basis, the system sends a message to the merchant informing that the order with a particular TRN has not been confirmed within time period ta. In this case the merchant sends a reminder message to the customer in step 250, informing about the outstanding order and including the order details as for example the number and type of the items ordered, the value of the order and asking if the customer would like to confirm the order.

In addition, the merchant's system can be linked to the system of the direct provider of the goods or service, for example a distributor, manufacturer or a financial institution to assist merchants, agents and representatives with customer relations and sales. Thus, alternatively to performing step 250, the merchant's system may communicate with the system of the direct provider in step 244, and decides in step 246 if any promotional message or a special offer is to be sent to the customer.

The merchant's system includes an application that determines whether and/or which promotional messages, offers, discounts or related items/services are to be sent from the merchant's site to the customer. Notification may be achieved by e-mail auto-generation, or Web page postings. Notification may also be achieved by telephone via an automated calling system designed to deliver automated voice messaging or through a combination of e-mail and phone call from a service centre.

If no special offer or promotional message in to be sent to the customer, the merchant sends the reminder message to the customer an already described in step 250. Alternatively, the special offer or promotional message is sent to the customer in step 248. The order management system then checks again (step 252 and 254) if the order is confirmed within a certain predetermined time period tb. If confirmation of the order and payment instructions are given by the customer, the transaction processing system 19 settles the payment in the usual way (steps 230 and 232). Otherwise the order is deleted in the transaction processing system in stop 256 and a message is sent by e-mail, or other means of communication, to the merchant in step 258, informing that the outstanding order with a particular TRN has been cancelled. Advice of cancellation of the order may also be sent to customer from the merchant site by e-mail with details of additional promotions.

Figure 5:
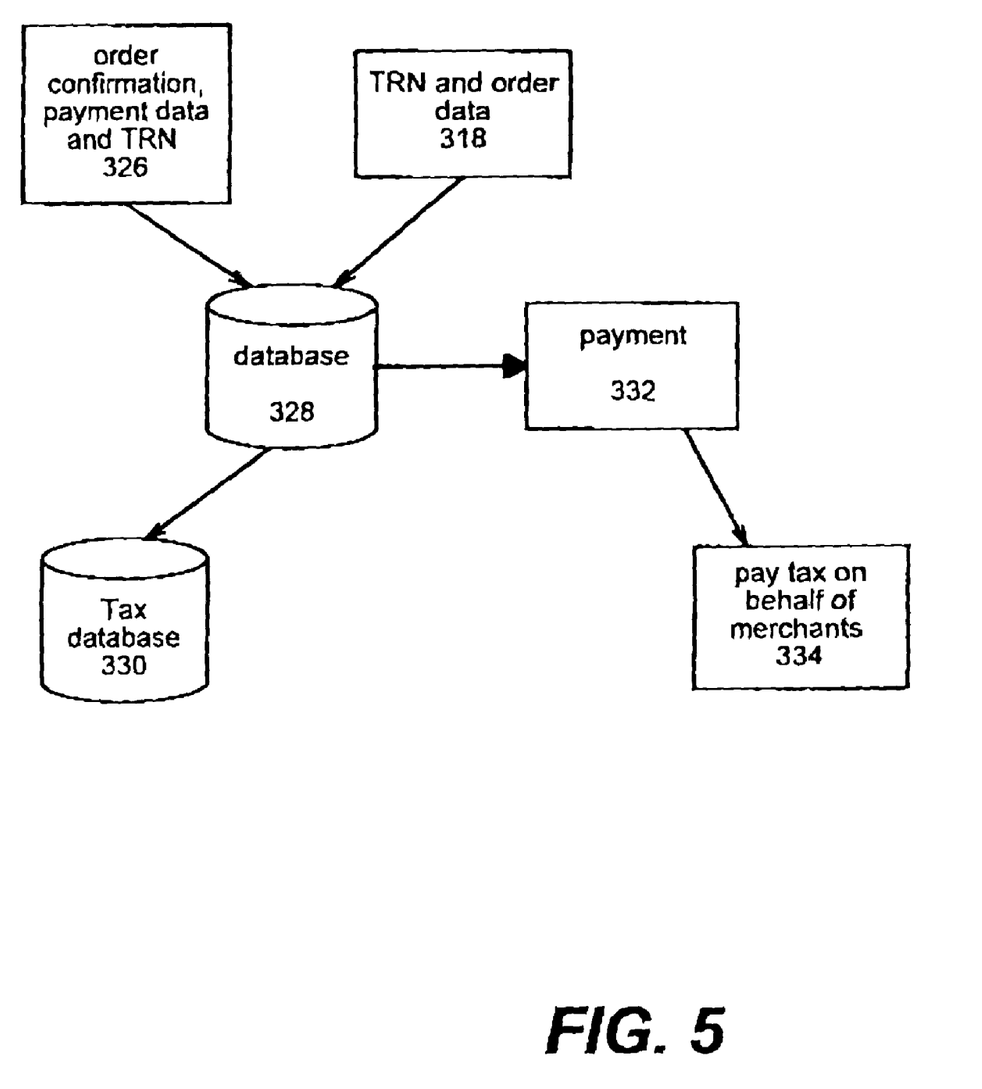
FIG. 5 is a general outline showing the steps of a tax processing system in another embodiment of the present invention.

The transaction processing system 19 also provides a method for direct processing of sales tax for goods purchased over the Internet. Reference should be made in the following to FIG. 5.

Collection of taxes levied on goods and services for sales via the Internet is an increasing concern to the Exchequers of most Governments. The transaction processing system 19 enables the delivery of all relevant data necessary to apply such tax to a financial institution or credit card company together with confirmation by the customer that such information is correct. Transaction data is then processed by the financial institution or credit card company and recorded in a certified 'sales tax' accounting system or database 330. Such records may then be used to submit collected funds directly to an authority representing a particular government department. The process can be concurrent with payment to merchants. The merchant's statement will show the usual information and details for deduction of sales tax and may be used for accounting purposes.

A system as described in this embodiment of the present invention provides a solution for the collection of 'sales tax' for purchases performed over the Internet. Government departments are able to collect tax on males via the Internet directly and centrally.

In step 318 the TRN and order data are transmitted from the merchant to the transaction processing system 19. Additional information necessary to process the collection of 'sales tax' and transmitted from the merchant to the transaction processing system 19 in step 318 may comprise the following details: merchant ID (identification code supplied by credit card company or similar), website URL, Registered taxation address/ code (i.e. VAT registration number), transaction reference number (TRN), suitable order details (product code, price, tax code, subtotals etc.), origin of order and destination of products/service/information (delivery address and point of use). In step 326 the order confirmation and payment data are transmitted from the customer to the transaction processing system 19. In addition the following details may be supplied by the customer in step 326: name, address and personal identification number (PIN or other authorization code). The customer may also confirm in stop 326 the delivery address, the value of transaction, tax to be paid, and an e-mail address. The order and payment data are stored in a local database in the transaction processing system 19 (step 328). The TRN is used as a key to match the information, as explained in the description of the other embodiments of the present invention. In addition, all tax-related data are stored in tax-database 330. In response to receiving the order data and customer details from the merchant and the order confirmation and payment data from the customer the transaction processing system 19 settles the payment in step 332 including the sales tax via a credit card institution or a tele-banking system. The sales taxes are directly paid to the government department in step 334 using the tax relevant data stored in database 330. The transaction processing system 19 is thus preferably one of many which each operate in different regions, nationwide or throughout an area with a common sales tax system.

The merchant cites check, for example by geographical IP address resolution or other terminal location-detecting technologies such as the Mobile Positioning System (MPS) or similar network-based cellular terminal location detection systems, in which country or area a particular customer lives and select the appropriate transaction processing system which operates in the country or area of the customer's location. The method provides enhanced transparency for the collection of sales taxes for purchases over the Internet, because the payment is settled in the same area as the sales taxes are settled.

A further aspect of the present invention lies in that there is provided a way for the customers, or their financial guardians, to control spending by means of credit control parameters such as amounts spent, types of orders and/or the identity of sites on which money is spent to control payments. This in referred to as a virtual allowance account (VAA). It is for example possible to limit the payments for purchases over the Internet to a certain amount per particular time period. Such credit control parameters may be set by the customer, or their financial guardian (who controls the VAA) in the transaction processing system 19, either via the Internet or telephone. A VAA authorization code is necessary to alter any credit control settings. The settings are stored in a VAA record in the local database 15 of the transaction processing system 19. The transaction processing system 19 monitors and controls the payments settled on an order-by-order basis for a particular customer, in accordance with the credit control parameters set previously. Thus, particular orders which fall outside the credit control parameters will not be settled, even though the customer may supply the correct payment details.

Payment via a tele-banking system provides a possibility for customers without access to a credit card to purchase over the Internet. In the way described above the customers can directly control payments via their bank account facilities.

Whilst in the above-described embodiments the Internet and/or e-mail is used to transmit data and messages between the merchant and the customer (communications links 10 and 14) and the merchant and the transaction processing system 19 (communication links 16 and 26), any other form of communication or any combination of different communication may be used alternatively. For example, the communications may take the form of a postal link, with letters being automatically generated by the merchant system, or fax communications, with faxes being automatically generated by the merchant system.

In addition, whilst the secure data link between the customer and the transaction processing system 19 is described as a telephone line in the above described embodiments, it is appreciated chat any other secure communications link other than that one for transmitting the order data and customer details from the merchant to the transaction processing system may be applied. For example, the transaction may be confirmed, with the same data elements as described above being input and transferred, via a secure Web site or the like provided by the transaction processing system and/or the customer's financial institution. The customer may use any one or more of a desktop computer, laptop computer, handheld personal digital assistant (PDA), cellular smartphone, a Wireless Application Protocol (WAP) or I-mode™ device, etc. to access such a site.

Whilst in the above-described embodiments only an order reference (TRN) is used, alternatively two or more different order references may be applied: for example a first one which is generated by the merchants system and transmitted to the transaction processing system together with the order data. A second one may be used by the customer and transmitted to the transaction processing system to confirm the order and give payment instructions. However, the transaction processing system must be able to match the two messages received by the merchant and the customer. According to the present invention order references are used for this purpose. Therefore at least a portion of the order references have to be the some in order to be used as a matching key. In this case at least a portion of the first order reference has to be transmitted from the merchant to the customer and can then be used as a portion of a second order reference.

In another embodiment of the present invention the system may further comprise an option to respond to the customer when a particular item which has boon ordered is currently not available. The merchant advises the customer by e-mail when the item will become available. The customer replies to e-mail either by confirming the previous order, or he or she might no longer be interested in the order, upon receipt merchant's system generates TRN and follows procedure described herein.

Whilst the transaction processing system 19 is primarily described as a transaction system for processing orders and payments, it is appreciated that it could be used to confirm any form of transaction that requires secure confirmation or agreement.

Whilst in the above embodiment, the customer may input a delivery address during the initial transaction with the merchant system, in an alternative embodiment, the transaction processing system may hold such data on behalf of the customer, confirm same with the customer during the transaction confirmation process, and supply same to the merchant system on authorizing the transaction. Thus, in one preferred embodiment, the customer only need supply, and the merchant need only store, one element of data, other than the order details, when setting up an order, namely the e-mail address or other message delivery destination identifier (for example a mobile telephone number) to which the offer message containing the TRN is to be transmitted.

Whilst in the described embodiment the transaction processing system transmits messages to the merchant in step 242 in order to inform the merchant that a particular order is unconfirmed and the merchant subsequently sends a reminder message to the customer in step 250, alternatively the transaction processing system may send a reminder message directly to the customer.

Figure 6:
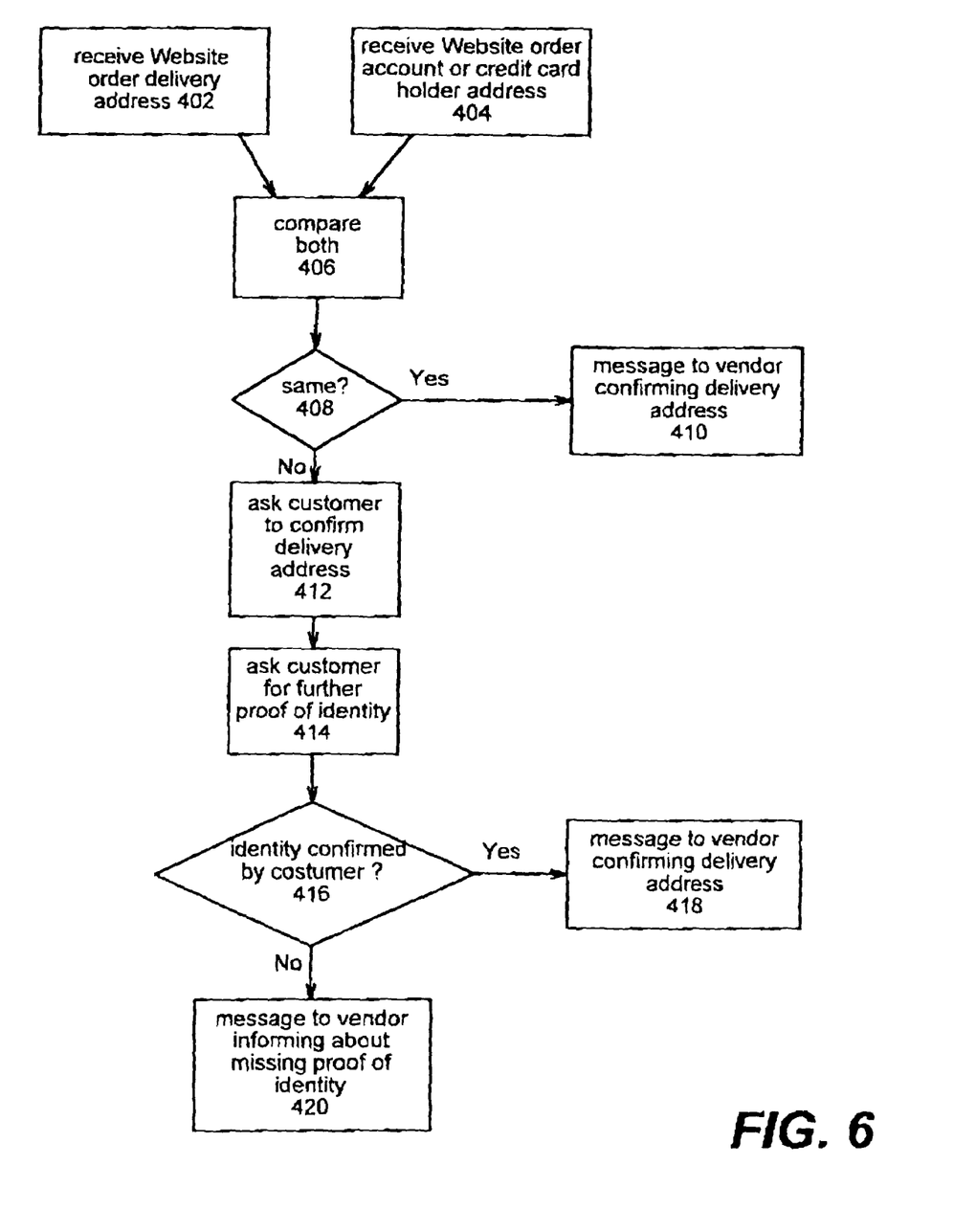
FIG. 6 is a flowchart diagram showing how additional security is provided for the merchants according to different embodiments of the present invention.

A further advantage of the above-described embodiments of the present invention is that the transaction processing system 19 provides additional security for the merchants. In the following it is referred to FIG. 2 and FIG. 6. The customer enters his or her details (step 104 of FIG. 2) when placing an order over the Internet. The customer details include a delivery address and the address of the account or credit card holder. The merchant receive those details in step 106 and passes them on to the transaction processing system 19 in step 116. The central transaction processing system receives both addresses in step 402 and 404 of FIG. 6, and compares both in step 406. If the two addresses given are not the same, the transaction processing system requires the customer to confirm the delivery in step 412. The merchant may require the customer to authenticate by way of a digital signature or certificate, which may be stored in the transaction processing system 19 during a registration process. In this way the further proof of identity is established (step 414) in the transaction processing system. This additional level of authentication may be provided for every transaction, or for other reasons also. In response to the steps described above, the transaction processing system 19 may either send a message to the merchant confirming the delivery address (step 410 and 418) or send a message in step 420 informing the merchant that different addresses of the customer have been determined and that the customer wag not able to proof his or her identity.

Prevention of fraud and the provision of a secure transaction processing system for the purchase of goods and services via the Internet or other such media which offers ease-of-use and promotes confidence in customers is the prime objective according to the described embodiment of the present invention. Access to information handled by a transaction processing system 19 is thus preferably limited to financial institutions in which all concerned may have confidence.

Financial institutions (i.e. credit card companies, banks, electronic money institutions (EMIL) etc) may control or integrate the transaction processing system, or any one or more element thereof, in their respective data networks. In an alternative to that described above, elements of the transaction processing system may be provided by the respective data processing systems of the financial institutions. For example, each of a plurality of financial institutions may include a secure portal in the form of an interactive voice response unit and/or a secure Web site replacing unit 17 of the central processing system as described above. The portal, forming one data communications interface, may be used by customers to access bank account details and also to perform the transaction confirmation processes as described above. The data processing systems, of the financial institutions then communicate with the central transaction processing system via appropriate secure data links and middleware systems, forming a second data communications interface, in order to retrieve transaction data, including TRNs, from the central system database 15 during a customer interaction and to confirm customer authorization of a transaction to the system by an appropriate authorization signal.

In the above embodiments, telephone numbers used to confirm transactions can be provided to customers by the institution which issues the customer's credit/debit card. This prevents unauthorized persons from setting-up a merchant site and advising a phone number not connected to the transaction processing system, which may cause a customer to pass personal details into the wrong hands.

In an alternative embodiment, the system is used for authorizing remote banking transactions. In this embodiment, the merchant location is omitted and a remote interface, for example a Web server is used by a financial institution to provide customers access to their bank account details and to enable the customer to instruct banking transactions, for example bill payments, transfers between accounts, confirm or cancel direct debits or standing orders or further to authorize loan agreements made with third parties, and suchlike. Such systems are currently known in the form of Internet banking systems. In this embodiment, the actions conducted by the merchant location in the above-described embodiment in order to confirm an order are instead conducted by the financial, institution data processing system, including the transmission of a messaged, for example an e-mail message to the customer providing details of the proposed transaction and a TRN. In order to authorize the transaction, the customer calls the financial institution, using a circuit-switched voice telephony connection, performs authentication using a secret code, enters the TRN, listens so the proposed transaction via a text-to-voice engine, and confirms the same if satisfied therewith, in response to which the financial institution data processing system authorizes the previously detailed transaction.

In a further alternative embodiment, the system is used to enable one party to authorize directions and/or instructions for a proposed transaction with a second party. An example of this is when a first party is arranging a loan agreement with a second party. In this embodiment, a first party transmits instructions, for example in the form of an electronic message, to the second party. The second party then transmits a response, for example also in the form of an electronic message, to the first party containing details of the proposed transaction and a TRN, generated in the second party data processing system as described above, and requests the first party to authorize the transaction using the system of the present Invention. The second party also transmits corresponding data to the system 19. IN order to authorize the transaction, the first party calls the system, performs authentication an described, and inputs the TRN. AT the first party's option, the details of the transaction as stored in the system may be communicated to the first party, for example by text-to-speech conversion, and the user may input a confirmation signal, for example a DTMF tone or voice command, to confirm the transaction. A payment may be transferred in order to record proof of the transaction, such that for example the transaction appears, along with, the TRN, on the bank statements of each party. On receipt of the confirmation, the system transmits an authorization signal to the second party to authorize the directions and/or instructions.

The term "public data network" as used above is intended to include data communications occurring over an Internet link (i.e. a TCP/IP connection), a public cellular radio system (e.g. a WAP connection), an interactive digital television system and the like.

It in to be appreciated that the invention covers any combination of the above-described embodiments.

It is to be understood that the embodiments described above are preferred embodiments only. Namely, various features may be omitted, modified or substituted by equivalents without departing from the scope of the present invention, which is defined in the accompanying claims.

What is claimed:

1. A method of operating a transaction processing system enabling users to authorize transactions, said system comprising a transaction processing system having at least a first data communications interface and a second data communications interface, comprising:
- receiving transaction data from an offering party, relating to a specific transaction to be authorized by a user, and receiving a first transaction reference relating to and uniquely identifying said specific transaction via a first data communication path, at said first data communications interface;
- generating a second transaction reference which is different from the first transaction reference and which uniquely identifies the transaction within the transaction processing system;
- sending said second transaction reference to the offering party but not to the user;
- after receiving said transaction data,
- conducting communications over a second data communication path, different from said first data communication path, with said user over said second data communications interface;
- using said second path, conducting a secure access procedure in which authentication data is received and said authentication data is verified;
- using said second path, receiving said first transaction reference relating to and uniquely identifying said specific transaction from said user, said first transaction reference not being previously transmitted to said user in said second communication path;
- using said second path, receiving confirmation from said user; and
- in response to said confirmation, transmitting an authorization signal to authorize said transaction, said authorization signal including said second transaction reference.

2. A method according to claim 1, wherein the communication via the second communication path is initiated by the user.

3. A method according to claim 1, wherein said transaction data includes payment data and, in response to said authorization signal, payment is electronically settled from an account facility provided by a financial institution.

4. A method according to claim 3, wherein payment is electronically settled to an account facility arranged to be only capable of receiving funds from, and not transmitting funds to, third parties.

5. A method according to claim 1, comprising transmitting said first transaction reference to a user in an electronic message.

6. A method according to claim 5, wherein said electronic message is transmitted to the user via a third data communications interface, and not said first and second data communications interface.

7. A method according to claim 5, comprising an offering party system generating said message without opening a customer account for the user on the offering party system.

8. A method according to claim 1, wherein said second communication path comprises a voice telephony connection, said second data communications interface comprising an interactive voice response unit.

9. A method according to claim 1, further comprising transmitting at least some of said transaction data to said user over said second path prior to receiving said confirmation.

10. A method according to claim 1, comprising using a first data processing system to receive said transaction data from a transacting party data processing system.

11. A method according to claim 10, wherein said first data processing system stores said transaction data in a database referenced using said second transaction reference which is different from the first transaction reference received from the user.

12. A method according to claim 10, wherein said transaction processing system comprises a plurality of second data processing systems, said second path being established with a selected one of said second data processing systems by the user.

13. A method according to claim 1, further comprising disabling transaction data relating to a transaction which is not authorized by a user within a selected time period.

14. A method according to claim 1, further comprising monitoring orders and order confirmations and transmitting a message to a transacting party in response to said monitoring when no user confirmation has been received.

15. A method according to claim 14, wherein said messages contain at least one of the following:
  (i) reminder of outstanding transactions;
  (ii) promotional messages relating to outstanding transactions.

16. A method according to claim 1, further comprising receiving tax-relevant data in said transaction data and settling taxes relating to said orders on behalf of a transacting party.

17. A method according to claim 1, comprising authorizing transactions on behalf of a plurality of transacting parties providing offers of transactions and a plurality of users accepting said offers and authorizing payment using the system.

18. A method of operating a transaction system in communication with a transaction processing system serving a plurality of different similar transaction systems, said method comprising:
- receiving transaction data from a number of customers;
- storing said transaction data in a record holding said transaction data as a pending transaction;
- generating first transaction references for referencing said transaction data;
- notifying said first transaction references to a transaction processing system;
- transmitting the same first transaction references to said customers; and
- authorizing a transaction corresponding to a particular set of said transaction data in response to said transaction processing system confirming the customer having authorized the transaction;
- wherein confirmation of any particular transaction is confirmed by receiving a signal including a second transaction reference different from the first transaction reference sent to the corresponding customer from said transaction processing system, said second transaction reference uniquely identifying the transaction within the transaction processing system and remaining unknown to the customer.

* * * * *

UNITED STATES PATENT AND TRADEMARK OFFICE
CERTIFICATE OF CORRECTION

PATENT NO. : 7,447,662 B2  Page 1 of 1
APPLICATION NO. : 10/332468
DATED : November 4, 2008
INVENTOR(S) : Gibson

It is certified that error appears in the above-identified patent and that said Letters Patent is hereby corrected as shown below:

Title Page, Item (73) Assignee: Should Read:

(73) Assignee: Vett Limited, Balderton (GB)

Signed and Sealed this

Seventeenth Day of February, 2009

JOHN DOLL
*Acting Director of the United States Patent and Trademark Office*